United States Patent
Wai et al.

(10) Patent No.: US 12,051,062 B2
(45) Date of Patent: Jul. 30, 2024

(54) BLOCKCHAIN SECURED TRANSACTION WORKFLOWS

(71) Applicant: Radian Group Inc., Wayne, PA (US)

(72) Inventors: Mark Wai, Newton Square, PA (US); Alissa Ware, Philadelphia, PA (US); Shailesh Lahoti, Pittsburg, PA (US); Carlos Gerardo Hernandez Castrejon, Denver, CO (US); Julie Eyden, Denver, CO (US); Sridhar Kotari, Toronto (CA); Raj Joshi, Toronto (CA)

(73) Assignee: Radian Group Inc., Wayne, PA (US)

( * ) Notice: Subject to any disclaimer, the term of this patent is extended or adjusted under 35 U.S.C. 154(b) by 174 days.

(21) Appl. No.: 17/503,569

(22) Filed: Oct. 18, 2021

(65) Prior Publication Data

US 2022/0374884 A1    Nov. 24, 2022

Related U.S. Application Data

(60) Provisional application No. 63/192,486, filed on May 24, 2021.

(51) Int. Cl.
*G06Q 30/00* (2023.01)
*G06Q 20/38* (2012.01)
*G06Q 20/40* (2012.01)
*G06Q 50/16* (2024.01)

(52) U.S. Cl.
CPC ..... *G06Q 20/3825* (2013.01); *G06Q 20/3827* (2013.01); *G06Q 20/4014* (2013.01); *G06Q 50/16* (2013.01)

(58) Field of Classification Search
None
See application file for complete search history.

(56) References Cited

U.S. PATENT DOCUMENTS 10,965,632 B2    3/2021   Golan
2005/0114151 A1*  5/2005   Graff ............... G06Q 40/02
                                              705/35

(Continued)

FOREIGN PATENT DOCUMENTS

WO   WO 2020/145966 A1   7/2020

OTHER PUBLICATIONS

PCT International Search Report and Written Opinion, PCT Application No. PCT/IB2022/054818, Sep. 5, 2022, eight pages.

*Primary Examiner* — Matthew T Sittner
(74) *Attorney, Agent, or Firm* — Fenwick & West LLP

(57) ABSTRACT

A blockchain system secures transaction workflows. The blockchain system includes a first node associated with a first party to a transaction and a second node associated with a second party to the transaction. The first node receives transaction data for the transaction. The first node generates a block for the transaction. The block includes the transaction data, a hash generated using the transaction data, and a hash of a prior block in a node data store of the first node. The first node sends the block to the second node and receives an indication that the second node has verified the block. The first node stores the verified block in the node data store. The first node may enable execution of the transaction after the block has been verified by all nodes involved in the transaction.

20 Claims, 9 Drawing Sheets

(56) References Cited

U.S. PATENT DOCUMENTS

| | | | |
|---|---|---|---|
| 2010/0174658 A1* | 7/2010 | Marlow | G06Q 30/00 |
| | | | 705/38 |
| 2017/0366516 A1 | 12/2017 | Pattanaik et al. | |
| 2018/0183600 A1* | 6/2018 | Davis | G06F 16/951 |
| 2018/0225660 A1* | 8/2018 | Chapman | G06Q 20/10 |
| 2019/0020725 A1* | 1/2019 | Kumar | H04L 41/40 |
| 2019/0050856 A1* | 2/2019 | Vintila | H04L 9/50 |
| 2019/0179801 A1* | 6/2019 | Jang | G06F 16/137 |
| 2020/0118096 A1* | 4/2020 | Yang | H04L 9/3239 |
| 2020/0151710 A1* | 5/2020 | Walters | G06Q 20/3825 |
| 2021/0090189 A1 | 3/2021 | Blackman et al. | |
| 2021/0092185 A1 | 3/2021 | DeRosa-Grund | |
| 2021/0105148 A1* | 4/2021 | Greven | H04L 9/0643 |
| 2021/0342855 A1* | 11/2021 | Kochura | G06Q 30/012 |
| 2022/0014377 A1* | 1/2022 | Vasudevan | G06F 21/64 |
| 2022/0083936 A1* | 3/2022 | Balinsky | H04L 9/088 |
| 2022/0327570 A1* | 10/2022 | Cooper | H04L 9/50 |

\* cited by examiner

BLOCKCHAIN SECURED TRANSACTION WORKFLOWS

CROSS REFERENCE TO RELATED APPLICATION

This application claims the benefit of U.S. Provisional Application No. 63/192,486, filed May 24, 2021, which is incorporated by reference in its entirety.

FIELD

The present disclosure relates to securing transaction workflows involving multiple parties using a blockchain system.

BACKGROUND

In real estate transactions, the post-mortgage application process typically includes tasks such as appraisal, title insurance, closing, and settlement. These tasks may involve actions performed by multiple participants such as a buyer, a seller, a mortgage lender, an appraiser, a notary, and agents. The tasks performed by these participants may use different computer systems that do not work together or communicate with each other. The information and documents associated with these tasks may become corrupted or otherwise improperly modified for some or all the participants. This can cause long turn-times and reduced process accuracy, among other issues. There is a need for secure end-to-end integration for all participants.

SUMMARY

Embodiments relate to securing transaction workflows involving multiple parties using a blockchain system. Some embodiments include a method performed by nodes of a blockchain system, such as a first node associated with a first party to a transaction and a second node associated with a second party to the transaction. A method may include, by the first node, receiving transaction data for the transaction. The first node determines the second party to the transaction based on the transaction data. The first node generates a block for the transaction. The block includes the transaction data, a hash generated using the transaction data, and a hash of a prior block in a node data store of the first node. The first node sends the block to the second node and receives an indication that the second node has verified the block. The first node stores the verified block in the node data store.

In some embodiments, the first node enables execution of the transaction after receiving the indication that the second node has verified the block. The transaction may be executed by a workflow engine and workflow workers that execute on one or more servers.

Some embodiments include a system. A system may include a blockchain system including a plurality of nodes. The plurality of nodes includes a first node configured to: receive transaction data for a transaction, the first node being associated with a first party to the transaction; determine a second party to the transaction based on the transaction data; generate a block for the transaction, the block including the transaction data, a hash generated using the transaction data, and a hash of a prior block in a node data store of the first node; send the block to a second node of the plurality of nodes, the second node being associated with the second party; receive an indication that the second node has verified the block; and store the verified block in the node data store.

Some embodiments include a non-transitory computer readable medium comprising stored program code that, when executed by one or more processors of a first node of a blockchain system, configures the one or more processors to perform steps such as those described above and herein. For example, to receive transaction data for a transaction, the first node being associated with a first party to the transaction; determine a second party to the transaction based on the transaction data; generate a block for the transaction, the block including the transaction data, a hash generated using the transaction data, and a hash of a prior block in a node data store of the first node; send the block to a second node of the blockchain system, the second node being associated with the second party; receive an indication that the second node has verified the block; and store the verified block in the node data store.

Figure 1:
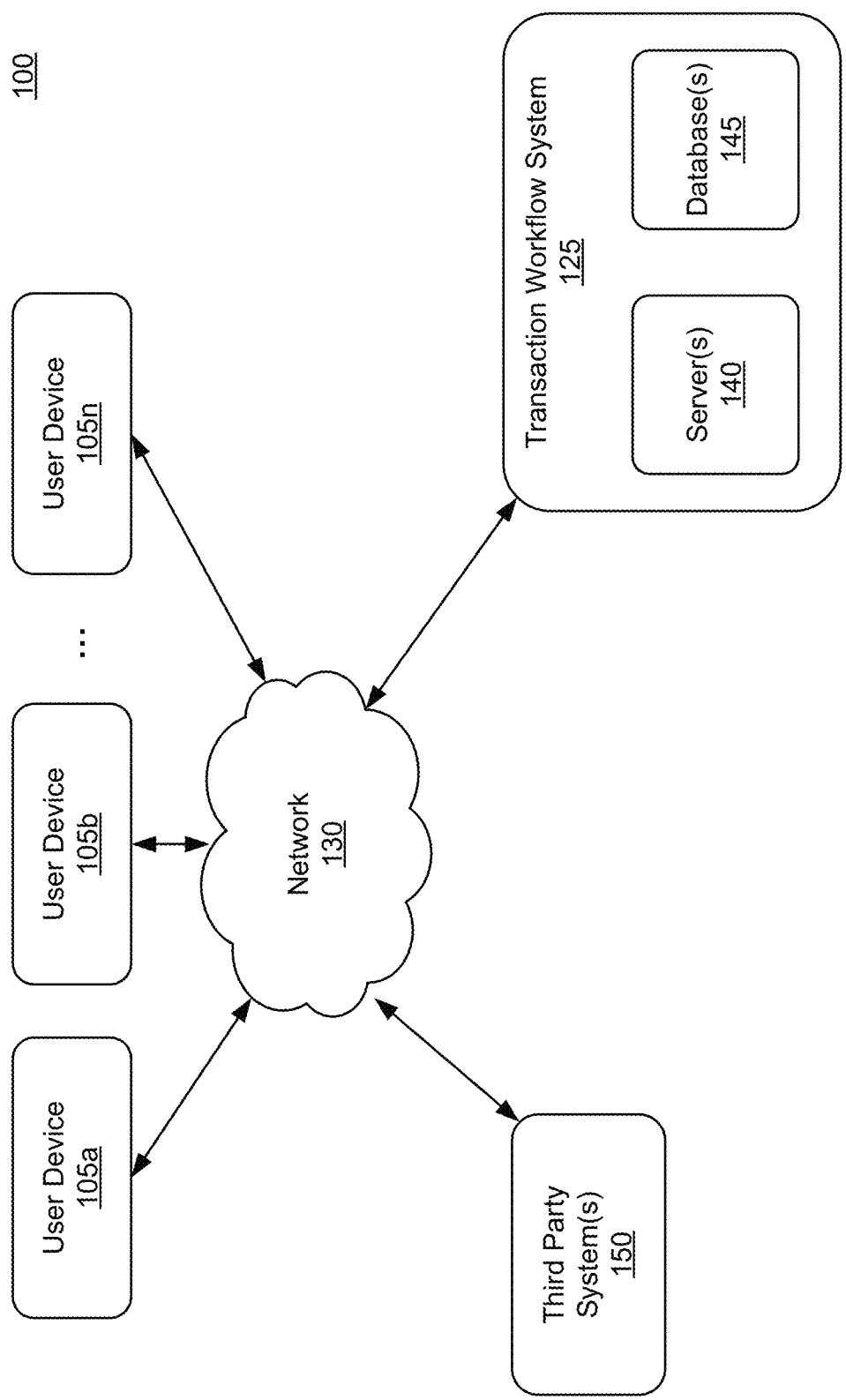
FIG. 1 is a block diagram of a system environment for secure transaction workflow involving multiple parties, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to securing transaction workflows involving multiple parties using a blockchain system. The blockchain system includes multiple nodes. Each node includes a node data store and a node object store, which may be immutable databases. The node data stores of the blockchain nodes provide a ledger of connected blocks. Each block may include transaction data of a transaction, a hash generated using the transaction data, and a hash of a prior block in the node data store. Each block may further include document metadata for documents of the transaction. The node object stores store the documents of the transaction. Each node may be associated with a party. A transaction may involve multiple parties, and thus multiple nodes of the blockchain system.

When a node receives transaction data and documents for a transaction, the node generates a block. The block, including the transaction data, and documents may be sent to the nodes of other parties to the transaction for verification. After the transaction data and/or documents are verified by the nodes, the block is stored in the ledgers of the node data stores of the nodes. The documents, which are referenced by the block, are stored in the object data stores of the nodes.

After successful verification of the block, the nodes may enable execution of the transaction. The transaction may be executed as workflow tasks by one or more servers that implement a workflow engine and workflow workers. The workflow engine may generate tasks based on the transaction data and documents and the workflow workers execute the tasks. In one example, a task may include procuring additional data needed to complete the transaction. In another example, a task may include procuring an electronic signature for a document. As such, execution of the tasks may result in creation of additional transaction data and documents. These transaction data and documents (e.g., signed documents) created via execution of the tasks may also be validated and recorded (e.g., in blocks) by the blockchain nodes, and if necessary, additional workflow tasks may be enabled and executed. This process may be repeated until the transaction has been completed.

As such, the blockchain system secures the transaction workflow by ensuring that the transaction data and documents that are used or generated in the transaction workflow are secure (e.g., immutable and difficult to modify once blocks are stored in the ledger), accurate and consistent for all parties, verified by the parties, and readily available to the parties. Furthermore, the workflow engine and workflow workers provide automated end-to-end transaction processing for an end-to-end guided digital experience for homebuyers, real estate agents and lenders through the entire closing process. The workflow engine and workers are architected on using micro service best practices to decouple processing from orchestration. Data is immutable and transparent to all participants of the real estate transaction while providing real time updates of the process. The system integrates with machine learning (ML) and artificial intelligence (AI) services to build unique workflow for each transaction. Direct, point-to-point communication of data on a need-to-know basis between participants allows for very fine-grained control of data sharing and privacy. The system also may provide for hybrid support to host within different ecosystems, including the customer existing IT ecosystem. Furthermore, the system may be implemented using Infrastructure as Code (IaC) to manage and provision computing resources through machine-readable definition files.

Although examples of transactions discussed herein include real estate transactions or post mortgage application transactions, the systems and processes discussed herein are not limited to these examples and may be applied to other types of transactions that are automatically executed and secured using a blockchain system. FIG. 1 is a block diagram of a system environment 100 for secure transaction workflow involving multiple parties, in accordance with one or more embodiments. The environment 100 includes user devices 105a through 105n (individually referred to as user device 105), a transaction workflow system 125, one or more one or more third party systems 150, and a network 130. Some embodiments of the environment 100 may have different components than those described here. Similarly, in some cases, functions can be distributed among the components in a different manner than is described here.

The user devices 105 may be various types of computing devices, such as a smartphone, tablet, laptop, or desktop computing device. Each user device 105a through 150n may be associated with a party that participates in transactions managed and executed by the transaction workflow system 125. In one example, the parties may include parties to a real estate transaction and/or mortgage transaction, such as home buyers, mortgage lenders, appraisers, title insurance providers, real estate agents, notaries, etc.

The transaction workflow system 125 manages and executes the transactions on behalf of the parties using the user devices 105. The transaction workflow system 125 includes one or more servers 140 and one or more databases 145. The transaction workflow system 125 may include a blockchain system include a plurality of nodes, where each node may be associated with a party. The transaction workflow system 125 may also include a workflow engine and workflow workers that execute the transactions after validation of transaction data and documents by the blockchain system. Additional details regarding the transaction workflow system 125 are discussed in connection with FIG. 2.

The third party system(s) 150 include systems associated with line of business (LOB) applications (e.g., title and escrow production platform), electronic signature applications, government fee sources, and property data sources. The transaction workflow system 125 communicates with the third party systems 150 to process transactions that use data or services provided by the third party systems 150.

The network 130 connects the user devices 105, the transaction workflow system 125, and third party system(s) 150. The network 130 may include one or more local area networks, one or more wide area networks (e.g., including the Internet), or combinations thereof. The network 130 may include one or more wired networks, one or more wireless networks, or combinations of wired and wireless networks.

Figure 2:
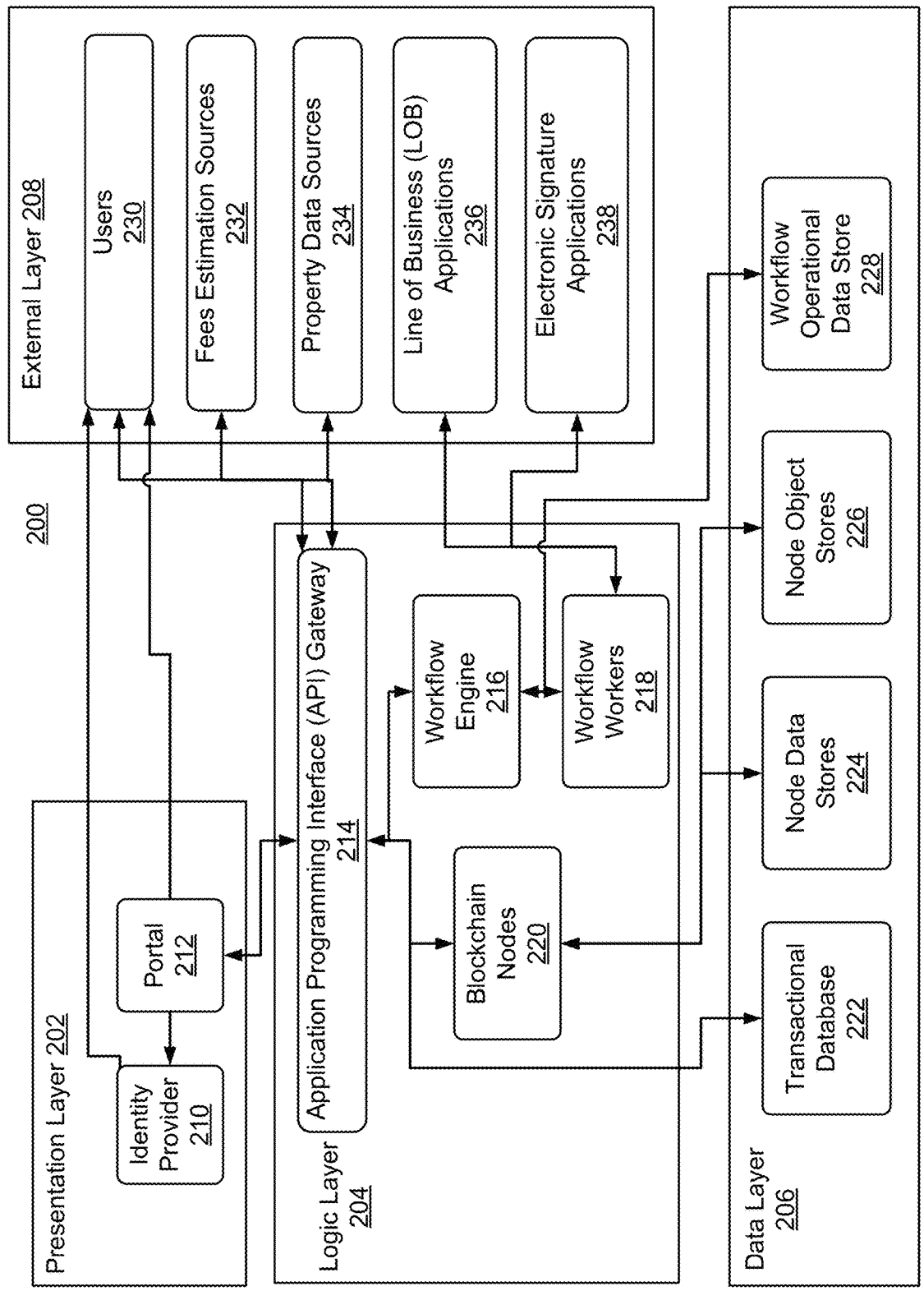
FIG. 2 is a block diagram of an application that executes on the transaction workflow system, in accordance with one or more embodiments.

FIG. 2 is a block diagram of an application 200 that executes on the transaction workflow system 125, in accordance with one or more embodiments. The application 100 includes processing components that may be distributed across the servers 140 and data storage components that may be distributed across the databases 145. Some embodiments of the application 200 may have different components than those described here. Similarly, in some cases, functions can be distributed among the components in a different manner than is described here.

The application 200 includes a presentation layer 202, a logic layer 204, a data layer 206, and an external layer 208. The presentation layer 202 includes an identity provider 210 and a portal 212 that each connect with the users 230 via their user devices 105. Each of these components may execute on one or more servers 140 of the transaction workflow system 125. The portal 212 provides the main entry point for the application 200. This is where the users 230 interact with the application 200 using their user device 105. The identity provider 210 manages user identities, provides for initial user authentication, and issues tokens (e.g., JSON web tokens (JWTs)) to be used in subsequent application requests.

The logic layer 204 includes an application programming interface (API) gateway 214, a workflow engine 216, workflow workers 218, and blockchain nodes 220. Each of these components may execute on one or more servers 140 of the transaction workflow system 125. The API gateway 214 handles interaction between the portal 212 and other components of the application 200, providing enforcement of authentication/authorization controls. The API gateway 214 also performs routing and encapsulating connections made to the components of the external layer 208. The API gateway 214 also allows for API calls to be made to the transactional database 222 to store and persist transactional data, such as (e.g., email) communications and quote data (e.g., property data, loan amount, purchase price, and fee data) for mortgage quotes.

The workflow engine 216 orchestrates the processing of workflows for transactions. The workflow engine 216 generates process definitions for workflow tasks that are executed by the workflow workers 218. In some embodiments, the process definitions are defined using Business Process Model and Notation (BPMN) and/or Decision Model and Notation (DMN) representations. Each workflow may include multiple tasks that are executed by the workflow workers 218. The logic layer 204 may include multiple workflow workers 218 that execute tasks in parallel (e.g., for different workflows).

The workflow engine 216 communicates with the workflow operational data store 228 that stores the process definitions of workflows (e.g., defining the tasks of the workflow), the state of executing workflows, historic workflows, and other operational data. In some embodiments, the workflow engine 216 stores the tasks of the workflows in the workflow operational data store 228 and the workflow workers 218 retrieve and execute the tasks from the workflow operation data store 228. In some embodiments, the workflow engine 216 assigns particular tasks to workflow workers 218. In some embodiments, the workflow engine 216 places tasks in a queue within the workflow operational data store 228, and workflow workers 218 retrieve the tasks within the queue for execution. After execution of each task, the workflow worker 218 may update the state of the workflow within the workflow operational data store 228, either directly or by sending a status update to the workflow engine 216 that updates the workflow state.

In some embodiments, the workflow engine 216 uses a machine learning model to intelligently distribute and direct tasks and workflows, based on application conditions and statuses. For example, the workflow engine 216 may generate suitable tasks based on the transaction data and documents that are verified and/or validated by the blockchain nodes 220. For example, the workflow engine 216 may determine a state of the transaction based on the data that has been verified or validated by the blockchain nodes 220 and use the state of the transaction to generate additional tasks that need to be completed to finalize the transaction. Depending on the transaction, some tasks may need to be performed in serial (e.g., when a task requires data obtained in a prior task) while others can be performed in parallel. The workflow engine 216 may generate and distribute tasks based on task dependencies in an optimized manner to facilitate fast and efficient processing of the transaction.

Some examples of tasks in a transaction workflow may include valuation, settlement, title insurance, and electronic signature. The valuation task refers to determining quote data for a mortgage application. The quote data include determination of a loan amount, purchase price, and fee data (e.g., premium, ancillary, government, etc.) The settlement task refers to transfer of ownership of a property from the seller to the buyer and may include signing of documents and transfer of funds. The title insurance task refers to the process of reviewing, correcting, or protecting against defects in the title to a property. Electronic signature refers to signing of documents, which may be separate tasks or parts of other tasks in a workflow.

The blockchain nodes 220 validate and record transaction data and documents associated with the transactions. Each blockchain node 220 may be associated with a party to transactions. The blockchain nodes 220 may control the execution of the transactions by the workflow engine 216 and workflow workers 218. For example, the blockchain nodes 220 may approve and validate transaction data (e.g., including order data that initiates a transaction) and documents of a transaction. After the transaction data and/or documents are verified by all blockchain nodes 220 involved in the transaction, the blockchain nodes 220 may enable the execution of the transaction. The verification may include programmatic verification as well as verification by users. The transaction may be executed as workflow tasks by workflow workers 218 and as defined by the workflow engine 216 using the verified transaction data.

Execution of the tasks may result in creation of additional transaction data and documents. The transaction data and documents (e.g., signed documents) created via execution of the tasks may also be validated and recorded by the blockchain nodes 220, and if necessary, additional workflow tasks may be enabled and executed. This process may be repeated until the transaction has been completed.

The blockchain nodes 220 may dictate the rules of the transactions and persist them in the node data stores 224 and the node object stores 226. Each blockchain node 220 may include an associated node data store 224 and node object store 226. As discussed above, different blockchain nodes 220 may be associated with different parties that participate in transactions. Here, blockchain nodes 220 facilitate execution of transactions on behalf of the parties that are associated with the blockchain nodes 220. The blockchain nodes 220, node data stores 224, and node object stores 226 are components of a blockchain system, are discussed in greater detail in connection with FIG. 3.

The data layer 206 includes the transactional database 222, the node data stores 224, the node object stores 226, and the workflow operational data store 228. Each of these components may be implemented on one or more databases 145 of the transaction workflow system 125. The transactional database 222 stores some or all the transaction data associated with transactions, such as prior to verification and validation by the blockchain nodes 220. In one example, the transaction data stored in the transaction database 222 may include quote data for mortgage quotes, such as property data (e.g., address, county, municipality, state, etc.), loan amount, purchase price, and fee data (e.g., premium, ancillary, government, etc.). Each mortgage quote may be identified and referenced by a quote identifier in the transactional database 222.

Each node data store 224 stores a ledger of blocks, each block defining a transaction, such as a state of a transaction.

The blockchain nodes 220 may each include a node data store 224, with the node data stores 224 collectively providing a distributed ledger. Each of the node object stores 226 stores documents associated with the transactions. The blockchain nodes 220 may each include a node data store 224 to store the documents for transactions that are handled by the node 220.

The workflow operational data store 228 stores process definitions of workflows (e.g., defining the individual tasks), the state of executing workflows (e.g., which tasks are active, being processed, completed, etc.), historic workflows, and other operational data. The workflow engine 216 stores the workflows in the workflow operational data store 228, and the workflow workers 218 retrieve the tasks of the workflows from the workflow operational data store 228 and execute the tasks.

The external layer 208 connects to various entities or components (e.g., including third party systems 150) outside of the application 200 through external endpoints. These entities or components may be used to facilitate execution of the transactions. The external layer 208 may connect to users 230, fee estimation sources 232, property data sources 234, line of business (LOB) applications 236, and electronic signature applications 238. The users 230 connect to the application 200 via user devices 105, including the identify provider 210, the portal 212, and the API gateway 214. The fee estimation sources 232 provide fee data associated with real estate transactions to the logic layer 204 via the API gateway 214. The fee data may include insurance premium fees, ancillary fees, government fees, etc. The property data sources 234 provide property data about real estate properties to the logic layer 204 via the API gateway 214. The property data may include property address, county, municipality, state, etc. The LOB applications 236 provide a title and escrow production platform to the logic layer 204 via the workflow workers 218. The electronic signature applications 238 provide for electronic document signing to the logic layer 204 via the workflow workers 218. The logic layer 204 may communicate with these components to facilitate execution of transaction workflows.

Figure 3:
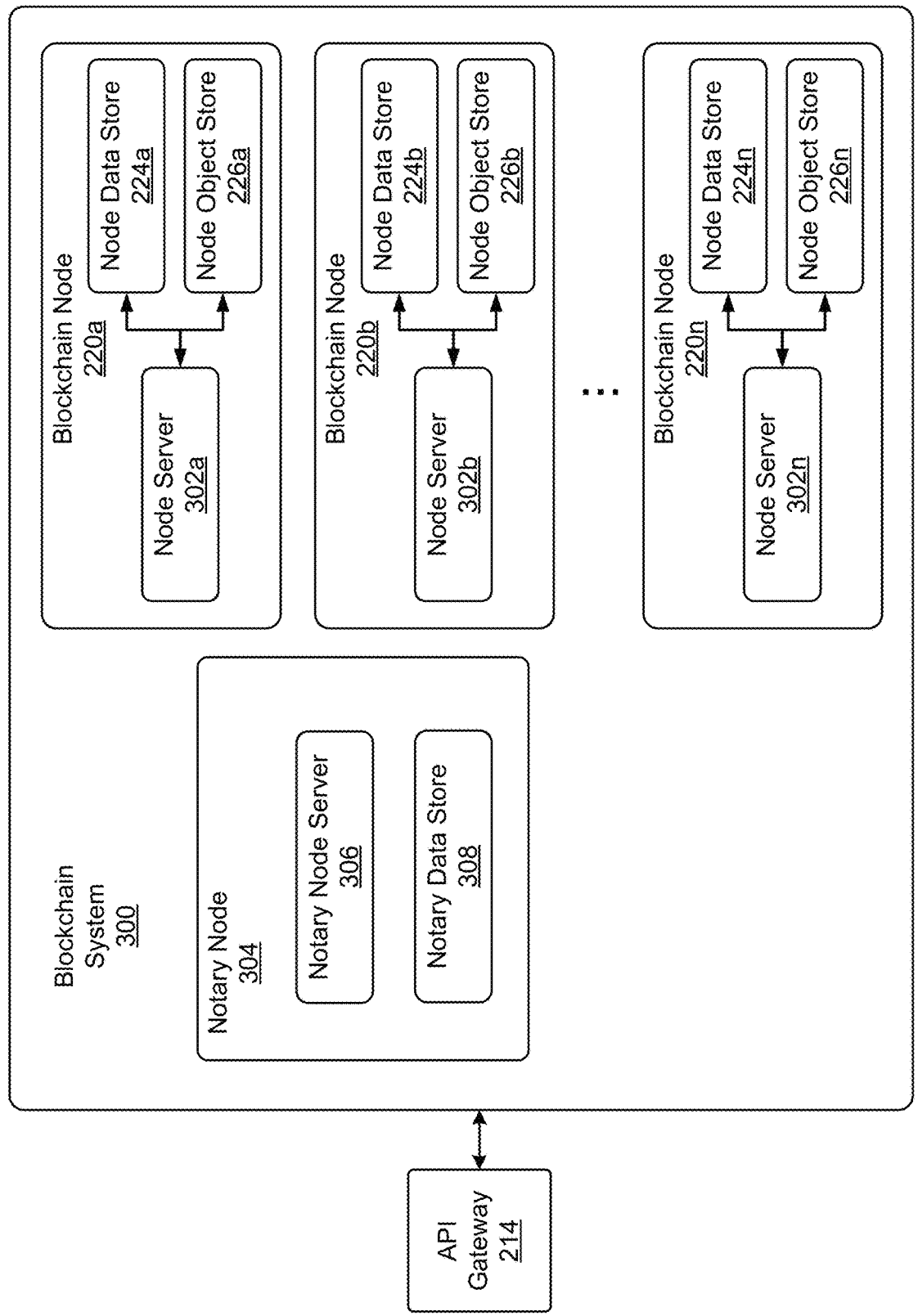
FIG. 3 is a block diagram of a blockchain system, in accordance with one or more embodiments.

FIG. 3 is a block diagram of a blockchain system 300, in accordance with one or more embodiments. The blockchain system 300 may include components that execute the blockchain nodes 220 of the application 200. The blockchain system 300 may include processing components that may be distributed across the servers 140 and data storage components that may be distributed across the databases 145 of the transaction workflow system 125. Some embodiments of the blockchain system 300 may have different components than those described here. Similarly, in some cases, functions can be distributed among the components in a different manner than is described here.

The blockchain system 300 includes blockchain nodes 220a through 220n (each blockchain node 220 is also referred to as node 220). The nodes 220 may be connected to each other via a network, such as the network 130. Each node 220 includes a node server 302, a node data store 224, and a node object store 226. For example, the node 220a includes a node server 302a, a node data store 224a, and a node object store 226a. The node 220b includes a node server 302b, a node data store 224b, and a node object store 226b. The node 220c includes a node server 302c, a node data store 224c, and a node object store 226c. Each node server 302 may include one or more servers. Each of the node data store 224 and node object store 226 may include one or more databases.

The node server 302 performs processing operations of the node, including read and write operations into the node data store 224 and node object store 226. In some embodiments, some or all the processing operations are defined by smart contracts that include program code that is executed by the node server 302. The node data store 224 stores a ledger of the node 220. The ledger includes blocks describing transactions or states of transactions. Each block may include transaction data of a transaction, a hash generated using the transaction data, and a hash of a previous block in the ledger (e.g., thus forming a blockchain). The block may also include signatures from each of the nodes 220 or "parties" involved in the transaction. The node 220 or other component of the blockchain system 300 may regularly validate signatures, hashes, and contents of blocks already committed to the ledger (e.g., to validate that the chain is not broken). A transaction may involve multiple parties, each represented by a node 220. In this case, a block for the transaction is stored in the ledger of the node data store 224 of the node 220 associated with each of the parties involved in the transaction. As such, the node data stores 224 of the nodes 220 form a distributed ledger. For a block to be added to the ledgers, a transaction is initiated at a node 220a, the transaction (e.g., including data and associated documents) is verified by a node 220b (as well as one or more other nodes 220 if more than two parties are involved) and/or the notary node 304, and the verified transaction is stored a block in the node data stores 224 of the nodes 220a and 220b (as well as any other nodes 220 if more parties are involved).

The node object store 226 of the node 220 stores documents associated with the transactions handled by the node 220. The documents may include digital document contents, including text and images. As discussed in greater detail below, document metadata may be stored separately from the document contents, such as in the ledgers of the node data store 224. The blockchain system 300 may also include one or more notary nodes 304. A notary node 304 includes a notary node server 306 and a notary data store 308. Each notary server 302 may include one or more servers. The notary node 304 provides uniqueness consensus for transactions. For a given transaction, the notary node 304 determines whether it has already signed other transactions that consumes any of the proposed transaction's input states. If the notary node 304 has not signed another transaction that consumes any of the input states of the proposed transaction, the notary node 304 signs the transaction. If any of the input states have been consumed by a previously signed transaction, then this is a double-spend attempt and the notary node 304 rejects the transaction. The notary data store 308 stores information about transactions signed by the notary node server 306 and the order of the signed transactions. The order of the signed transaction is used to facilitate the key services of transaction ordering and preventing double spends. The nodes 220 may be private and permissioned. The network of nodes 220 is accessible to parties (e.g., people and institutions with legal identities) that have been invited to the network, such as by the API gateway 214. All parties are identifiable by other parties, as well as by the API gateway 214. The API gateway 214 connects to the blockchain nodes 220 using a verified user's credentials (end-user or operations user) over HTTPS and uses HTTPS requests to initiate transactions (or queries) on behalf of that authenticated user on any given node 220. The API gateway 214 is also responsible for that the user it is initiating transactions on behalf of is authorized to perform that action. All nodes 220 are associated with at least one party, and each party is associated with one of the nodes 220. The nodes 220 may be peer nodes 220 that talk to each other using a peer-to-peer (P2P) protocol that allows (e.g., direct) point-to-point communication (e.g., no broadcasting as in conventional blockchain systems).

Parties (e.g., an institution such as a lender) can participate in the blockchain system 300 by owning a node 220. Some or all the nodes 220 may be deployed and maintained on behalf of the parties by the transaction workflow system 125. Some or all the nodes 220 may be deployed by the parties themselves, such as so long as the nodes 220 conform to certain specifications. When a party joins the blockchain system 300 (e.g., via a user device 125), they are verified by the API gateway 214 and receive a series of signed certificates, such as from the identity provider 210. These certificates will be used to assert the identity of the party on the blockchain system 300, providing access to the node 220 associated with the party.

Parties associated with the nodes 220 can selectively invite individual users (e.g., a borrower) to participate in specific transactions by creating an account for the individual on the node 220. Account owners may have their own logically separated section of the ledger in the node data store 224 and a public/private keypair used to sign and verify transactions.

The blockchain system 300 uses a distributed ledger technology (DLT) to track transactions related to on-ledger assets. The operation of the nodes 220 may be defined by program code called "flows" and "smart contracts." "Smart contracts" define the types of states (on-ledger assets) that can be tracked through these blockchain nodes 220 and the valid operations on those states. Common operations defined by smart contracts include rules to validate that fall into three categories: issue (creating a new state in a transaction to track some information/on-ledger asset that is not already exist on the ledger and thus is not already tracked by an existing state), mutate (update to the data captured by a specific state), and exit (consume an existing transaction without producing any outputs, thus preventing that state from being used in further transactions). States belong to a given smart contract if the smart contract dictates rules for validating any or all of the above types of transactions. Smart contracts include a set of agreed-upon rules that govern how transactions involving particular state types can be created, verified, and committed to the ledger. They are executed every time a new transaction is proposed by a node 220 that involves a state that belongs to particular smart contract. "Flows" are computer code that execute either as a scheduled activity, through user input from the API Gateway 214, or through the invocation of another flow. Flows use conditional logic (e.g., if, then, else) statements to determine whether or not to propose a new transaction. If it is determined that a transaction should be proposed, execution of flows include determining transaction participants, generating and proposing a new transaction, validating the transaction using the rules in the smart contract for each of the involved state types and signing the transaction, asking for validation/signatures from peer nodes, asking the notary node 304 to notarize the transaction, and committing the notarized transaction to the DLT.

The smart contract for a transaction may be agreed upon by all nodes 220 of the blockchain system 300 that are involved in a transaction. Transactions to update various states in a ledger are created by tasks defined in the workflows and agreed upon by the nodes 220 of the blockchain system 300. All transactions are associated with (and signed by) known participants, and transactions can be traced back to their requesters and signers. The blockchain system 300 chains together related transactions, each transaction represented by a block, thus forming a blockchain.

Ledger updates (e.g., transactions) do not depend on consensus algorithms but instead on the rules outlined in the smart contracts, the processes used to generate them outlined in the flows, and the signatures of the interested parties. Transactions are a combination of input states, outputs states, and other data that are verified and signed by the parties participating in the transaction. Transactions are assigned a unique, cryptographic hash computed from some or all the above-mentioned fields (e.g., the input states, outputs states, other verified data, and the signatures of the signers). Once a transaction has been signed by all parties, it is sent to notary node 304 that validates and signs the hash of the transaction block. The transaction is then committed to the ledger of the node data store 224 of each node 220 involved in the transaction to be stored immutably.

In some embodiments, the nodes 220 may each be packaged as containerized application and deployed to a computing infrastructure. The computing infrastructure may include various types of computing infrastructures capable of running containerized applications, such as public cloud, on-premises, or hybrid cloud. Owners or operators of the nodes 220 may configure and deploy additional states, smart contracts, and flows to their own nodes to extend their functionality without compromising the security or reliability of the rest of nodes 220 on the network. Nodes 220 may be preconfigured to use PostgreSQL for the ledger but can also be configured to use other types of relational database management system (RDBMS), such as per existing organizational SQL database infrastructure.

The blockchain system 300 provides for storing, updating, and retrieving of digital document metadata and content. Each node 220 on the network maintains documents using an on-ledger entity called a "DocumentState" to store the metadata and an off-ledger record of the digital document's content. With respect to on-ledger, the DocumentState is a ledger asset stored in the node data store 224 that contains metadata surrounding a digital document such as the name, type, versions, audit history, and cryptographic hash of the document content. With respect to off-ledger, the document's content is stored in the node object store 226. In some embodiments, the node object store 226 may be part of a remote or on-premises system that encrypts the data at rest and uses strong authorization and authentication policies to only allow access by the owning node 220.

The node object store 226 stores a group of off-ledger records of all documents uploaded to a node 220, which is referred to as a DocVault. A DocVault belonging to a specific node 220 can only be accessed by flows originating from that node 220.

All workflows interfacing with the DocVault of a node 220 may (e.g., constantly) check and verify the cryptographic hash of the document as stored in the DocumentState to ensure the document content has not been corrupted or tampered with. These hashes are also verified when interacting with nodes 220 that have their own copies of these documents to ensure each peer node 220 has the same version of the document. In some embodiments, the DocVault is configured to use Binary Large Object (Blob) storage to store the documents as unstructured data.

The blockchain system 300 may use various types of security for transmitted and stored data, such as Transport Layer Security (TLS) and Encryption at Rest. The blockchain system 300 may be sectioned off from the public internet and communicate externally via the API gateway 214. The nodes 220 and 304 may use TLS secured channels to communicate with each other. The nodes 220 and 304 may also use TLS secured channels to communicate with the API gateway 214. The node server 302 of each node 220 may communicate with the node data store 224 and node object store 226 of the node 220 using TSL secured channels. The node data store 224 and node object store 226 may each use Encryption at Rest to secure the stored data.

Figure 4:
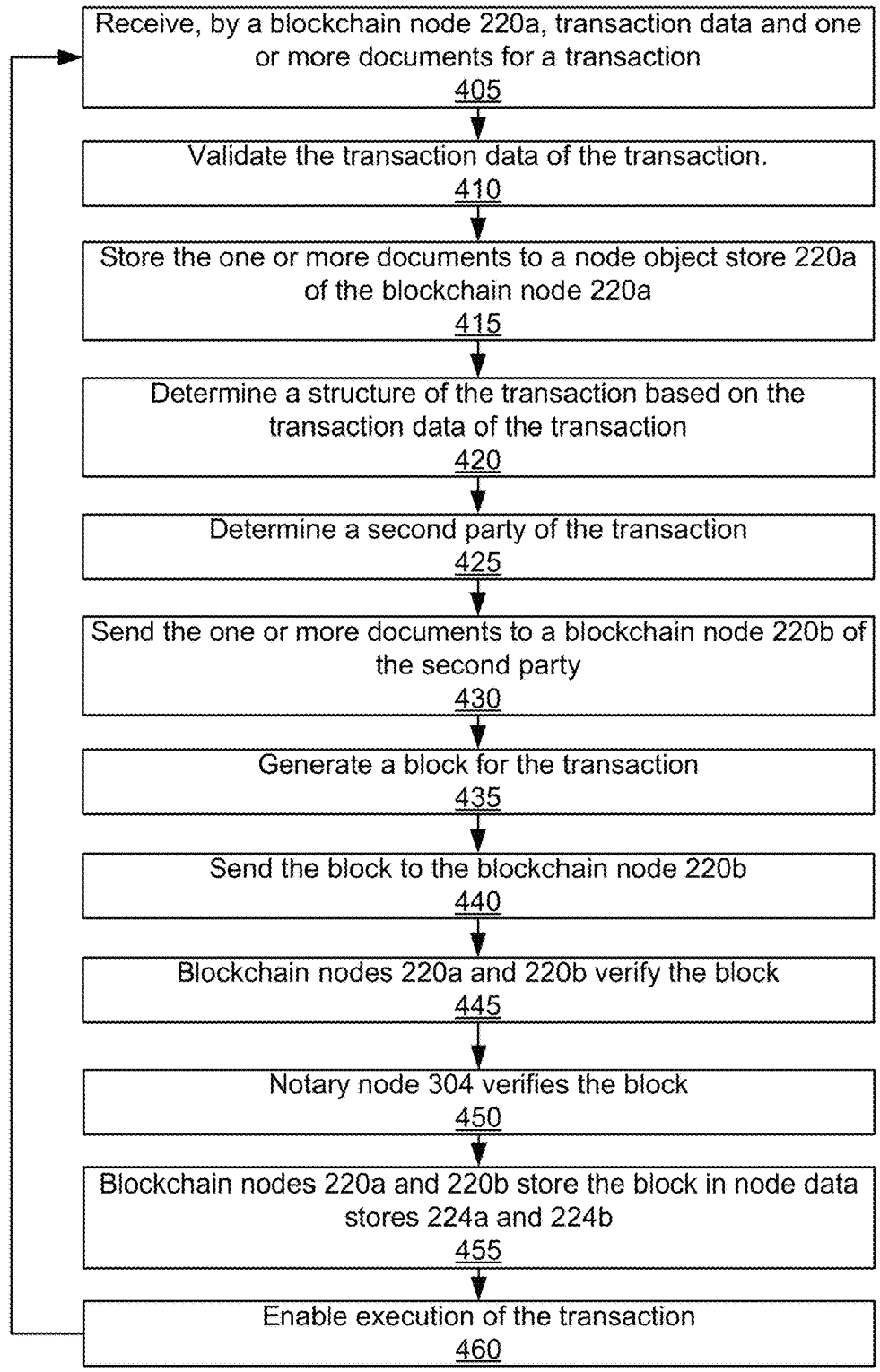
FIG. 4 is a flowchart of a process for securing a transaction using a blockchain system, in accordance with one or more embodiments

FIG. 4 is a flowchart of a process 400 for securing a transaction using a blockchain system, in accordance with one or more embodiments. The transaction may be part of a post mortgage application process involving multiple parties that is secured by the blockchain system 300, where each party is associated with a node 220 of the blockchain system 300. The process 400 may include fewer or additional steps, and steps may be performed in different orders than those described.

A blockchain node 220a associated with a first party receives 405 transaction data and one or more documents for a transaction. The blockchain node 220a may be a node of the blockchain system 300. The transaction data may include order data that defines a transaction received from a user device 105a. The blockchain node 220a and the user device 105a may both be associated with the first party. The first party may be a party that initiates the transaction. In one example, the first party is a mortgage lender that completes a loan application. The API gateway 214 may receive the order data and documents from the user device 105a and send the order data and documents to the blockchain node 220a. The order data and the documents may be sent from the API gateway 214 to the blockchain node 220a through a websocket connection over HTTPS. The connection between the API gateway 214 and the blockchain node 220a may include a TLS secured channel. In another example, the transaction data and one or more documents are generated by a workflow worker 218 via execution of workflow tasks for a transaction.

The transaction data of the transaction may include information regarding the transaction, such as property data (e.g., address, county, municipality, state, etc.), the loan amount, the purchase price, quote data, contact information, personal information for the borrower and co-borrower. The documents support the transaction, such as a sales contract, loan documents, closing documents, etc.

The blockchain node 220a validates 410 the transaction data of the transaction. The operations described as being performed by the blockchain node 220a may be performed by the node server 302a of the blockchain node 220a via execution of one or more smart contracts. Validating the transaction data may include programmatic validation (e.g., contract/flow validation) and user validation. Programmatic validation may include referencing external data sources, categorizing transaction data, ensuring data values are within thresholds, etc. User validation may include providing the transaction data to a user device 105. In some embodiments, transaction data may be validated by multiple users, such as each party to the transaction. In some embodiments, user validation is the primary mechanism for validation, but flows may also perform some validation, such as by ensuring that the user that is adding transaction data is actually someone that should be a party to the transaction data. In this case, validation includes ensuring the data represented by the transaction comprises of correct, meaningful data from the business perspective.

In some embodiments, new transactions are proposed as a result of an individual user or a series of users interacting with the user client on their user devices 105 which they submit requests to the blockchain nodes 220 to run various flows through the API gateway 214. Users are expected to perform some validation on transaction data before submitting the data to the blockchain nodes 220 (for example, they may be asked to make sure their identifying information is correctly represented in the transaction data). Once Flows running on nodes 220 receive the data, they may validate the data for programmatic constraints. These constraints may include ensuring the data are within thresholds, referencing external data sources (e.g., to upload, validate, download documents), categorizing transaction data, ensuring a correct list of required signers (e.g., participants/parties to the transaction), etc. Individual nodes may also do additional validation as configured by the node owners/operators (e.g., some parties may only want to accept blockchain transactions related to business transactions in specific physical jurisdictions).

The blockchain node 220a stores 415 stores the one or more documents to a node object store 226a of the blockchain node 220a. The node server 302a may store the documents in the node object store 226a in response to validating the order data of the transaction.

The blockchain node 220a determines 420 a structure of the transaction based on the transaction data of the transaction. The structure of the transaction may include a transaction workflow including tasks to be executed by the workflow workers 218. The structure of the transaction may also include the parties involved in the transaction or the state of the transaction (e.g., conditions satisfied so far, any additional conditions that must be satisfied for the transaction to be completed, etc.). In some embodiments, transactions contain information regarding the following: input states (the states' data+reference(s) to previous transaction(s) using the previous transactions' hash(es)), output states, participants/parties of the transaction, the version/hash of the flow and contract computer code(s) that generated and validated this transaction, timestamps, hash of the transaction, and signatures of involved parties+notary node(s). Transactions may include status of additional conditions to be completed but that is a requirement of the application, not the blockchain platform here (as in, it is required and dictated by the use case and is really meant to help map a business transaction that comprises of multiple steps to a blockchain transaction that stores information about each of the steps as an individual entry in the DLT).

The blockchain node 220a determines 425 a second party of the transaction. The second party may be defined based on the transaction data of the transaction. The transaction may include more than two parties. Each of the parties may be associated with a node 220 of the blockchain system 300.

The blockchain node 220a sends 430 the one or more documents to a blockchain node 220b of the second party. The documents may be provided to each blockchain node 220 associated with a party to the transaction. The blockchain node 220a may communicate with the other blockchain nodes 220 over a P2P connection secured via TLS.

In some embodiments, the blockchain node 220a may validate the transaction data and store the one or more documents to the node object store 226a in parallel with providing the one or more documents to the blockchain nodes 220 for storage in their respective node object stores 226. In some embodiments, the blockchain node 220a only provides the one or more documents to the other blockchain nodes 220 if the transaction data is validated.

The blockchain node 220a generates 435 a block for the transaction and sends 440 the block to the blockchain node 220b. The block may include transaction data (e.g., the order data) of the transaction, a (e.g., cryptographic) hash generated using the transaction data, and a hash of a prior (e.g., previous block) in the ledger of the node data store 224*a*. The block may further include document metadata for the one or more documents. The document metadata for a document may include a document name, document type, document version, document audit history, and a hash of the document content. In some embodiments, the document content and transaction data are combined and used to generate the hash for the block. The hash for the prior block may be generated using the data of the prior block. This results in linking the block to the prior block, thus reinforcing the integrity of the prior block.

In some embodiments, node 220*a* provides node 220*b* with the same information as the final block (e.g., stored in step 455) but not all signatures are present as node 220*b* would still need to validate and sign the transaction with their keys and the notary node 450 has not yet provided its signature. Hashes are computed on all of the information that's regularly part of the transaction mentioned above except the hash of the transaction and the signatures of the involved parties+the notary nodes. Thus, the hash for a new transaction B in a chain depends on input states (state data+reference hash(es)) from transaction A, data in new output states from this transaction B, participants/parties for this transaction, the version/hash of the flow and contract computer code(s) used to validate the states in this transaction, and timestamps of when the transaction was generated. In some embodiments, hashes are computed using SHA 256. Order data and document data are included as input state data and output state data as we have OrderStates and DocumentStates. DocumentContent is hashed (also using SHA 256) and may be used in conjunction with the rest of the document metadata and/or order data to generate the hash of the overall transaction. DocumentType is an application specific document type category. Document audit history includes information about who uploaded the initial version of the document, who updated the document with new versions, and who has accessed any of the versions of the document (all with timestamps). The hash of the document may include the hash of the document content computed using SHA 256 algorithm.

The blockchain nodes 220*a* and 220*b* verify 445 the block. Verifying the block may include verifying the transaction data and the document metadata for the block. Verification may include ensuring that transaction data or other data falls within expected thresholds/categories and programmatically legitimate. In some embodiments, verifying the block may also include verifying the one or more documents associated with the transaction data. If verified the blockchain nodes 220*a* and 220*b* may also sign the block. The blockchain node 220*a* may receive an indication from the blockchain node 220*b* regarding whether the blockchain node 220*b* has verified the block. If the blockchain nodes 220 of all parties have verified the block, the blockchain node 220*a* determines the block as being successfully verified. The blockchain node 220*a* may collect the signatures of one or more blockchain nodes 220 after these blockchain nodes 220 verify and sign the block.

In some embodiments, verifying the block includes verification of the chain of transactions leading up to the new proposed transaction of the block. When verifying a new transaction that a node 220 is proposing or has received from a peer node 220, the node 220 may check any previous transactions related to the same states. The node 220 may recompute the hashes of (e.g., all) previous blocks and ensure they match with the expected hashes as well as verify the signatures on all previous transactions in the chain. This step may sometimes not be required in situations where there are no previous related transactions/states to validate the history/chaining of.

In some embodiments, the node 220 attempts to verify document data by re-computing the hash of the document's content and ensure it matches with the most recent previous hash of the document (e.g., the nodes assert the document's content has not been corrupted or altered). Other verifications may include contract/flow validation, verification of the chain of transactions leading up to the new proposed transaction, or notary verification.

If node 220*b* verifies the transaction, node 220*b* will respond back to node 220*a* with a signature over the transaction that node 220*a* will eventually use to request the notary node(s) to notarize the transaction. If the node 220*b* does not find the transaction valid, node 220*b* responds to node 220*a* either by rejecting the signing request, indicating an outright rejection of the transaction, or it may respond with an amended transaction for node 220*a* to verify and sign.

A notary node 304 verifies 450 the block. For example, after successful verification by the blockchain nodes 220, the blockchain node 220*a* (or some other blockchain node 220) may send the block to the notary node 304 for the notary verification. Notary verification may include of the Notary node(s) validating that the proposed transaction does not attempt to consume states that have already been consumed (e.g., does not propose a double-spend). The notary node 304 sends a response to the blockchain node 220*a* indicating whether the block has been verified. The notary node 304 may provide uniqueness consensus for transaction of the block, such as to prevent double-spend attempts.

In some embodiments, by the time a notary node 304 receives a notarization request, all nodes 220 participating in the transaction will have all validated some individual data points and verified that the entire transaction data are programmatically legitimate. Their signatures may be included in the transaction object that the notary node 304 reviews before completing its final verification by checking for double spends. The notary node 304 will reject a transaction if it detects double-spends or if it determines necessary signatures are missing from the transaction (e.g., the transaction is accidentally incomplete or was maliciously proposed by bad actor node).

The validation and verifications of the block for the transaction data and/or documents ensures that this information both correct and consistent for all participants, thus helping to secure the transaction.

The blockchain nodes 220*a* and 220*b* store 455 the verified block in the node data stores 224*a* and 224*b*. The blockchain nodes 220 and 220*b* each serializes the block and stores the block to their respective ledgers. Each of the blocks stored in the node data stores 224*a* and 224*b* include a hash of a previous block, making each block resistant to modification. In some embodiments, the blockchain node 220*a* may send an indication that the block has been verified by all parties and/or validated by the notary node 304 to the blockchain node 220*b*. In response, the blockchain node 220*b* may store the block in the node data store 224*b*.

The node 220*a* enables 460 execution of the transaction by one or more servers (e.g., that implement the workflow engine 216 and workflow workers 218). For example, if the transaction has not been completed, the node 220*a* (or some other node 220) may provide the structure of the transaction and/or transaction data to the workflow engine 216. The workflow engine generates process definitions of tasks for a workflow of the transaction based on the received information and places the tasks in the workflow operational data store 228. The workflow workers 218 execute the tasks. Execution of the tasks may result in creation of transaction data or documents of the transaction. This data may be stored in the blockchain system 300 using the process 400. In that sense, the process 400 may be repeated as the workflow workers 218 execute tasks for the transaction. Execution of the tasks may result in the creation of transaction data and documents, which are received by the blockchain nodes 220 of the blockchain system 300, and so forth until the transaction has been completed.

Figure 5:
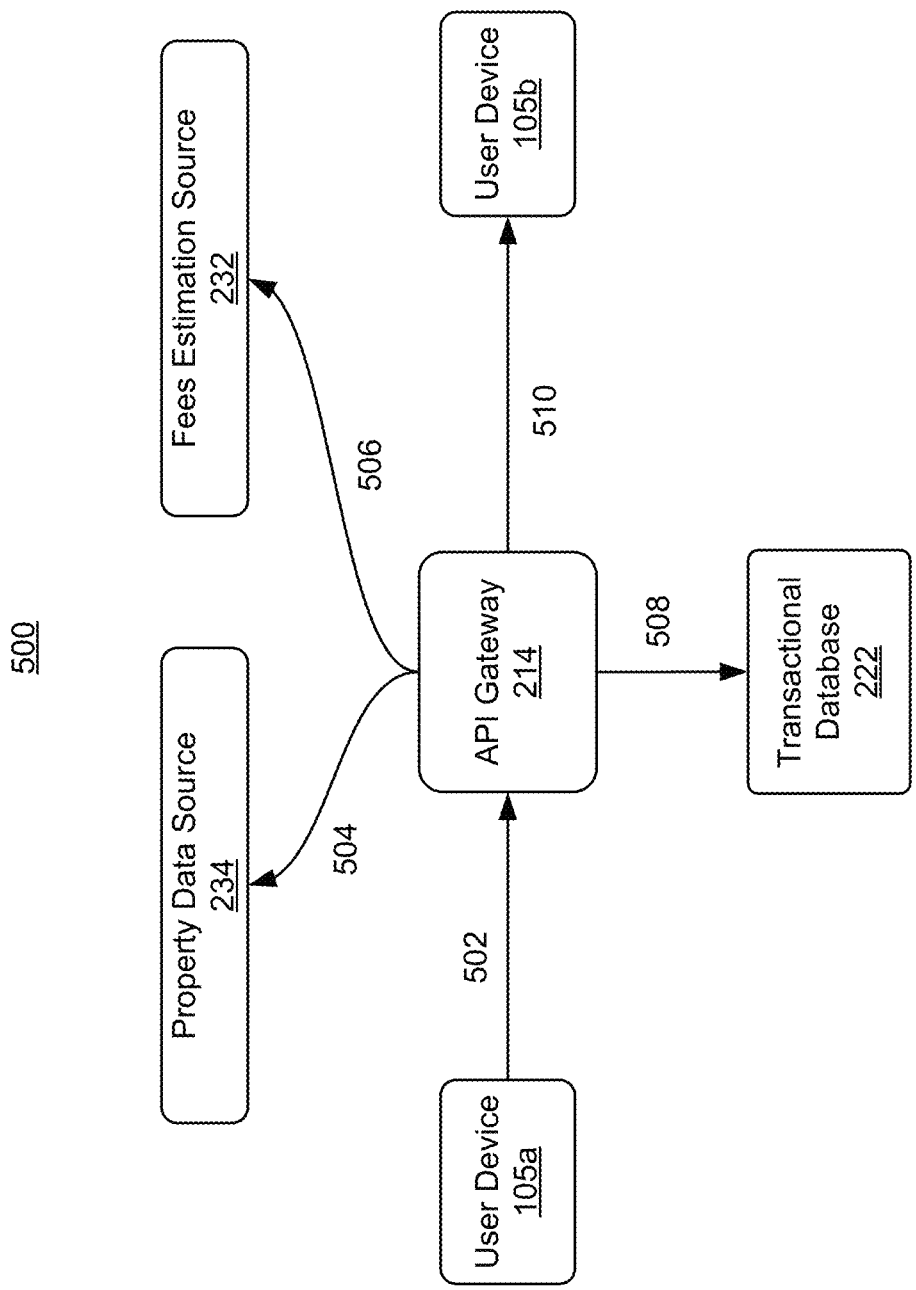
FIG. 5 is a diagram of a process for submitting a mortgage quote, in accordance with one or more embodiments

FIG. 5 is a diagram of a process 500 for submitting a mortgage quote, in accordance with one or more embodiments. The process 500 results in quote data that is used in a transaction. The process 500 may include fewer or additional steps, and steps may be performed in different orders than those described.

A user device 105a sends 502 a request for a mortgage quote to the API gateway 214. Communications between the user device(s) 105 and the API gateway 214 may be transmitted via the portal 212. The request may include a property address, a loan amount, and a purchase price.

The API gateway 214 retrieves 504 property data from a property data source 234. The API gateway 214 may send a request including the property address to the property data source 234. In response, the data source 234 may provide the property data including address of the property as well as the county, the municipality, or state where the property is located to the API gateway 214.

The API gateway 214 retrieves 506 fee data from a fee estimation source 232. The API gateway 214 may send a request including the some or all of the property data received from the property data source 234. In response, the fee estimation source 232 provides the fee data to the API gateway 214. The fee data may include insurance premium fees, ancillary fees, government fees, etc.

The API gateway 214 stores 508 quote data of the mortgage quote in a transactional database 222. The quote data may include the property data (e.g., address, county, municipality, state, etc.), the loan amount, the purchase price, and the fee data (e.g., premium, ancillary, government, etc.). Each mortgage quote may be identified and reference by a quote identifier in the transactional database 222. After storing the quote data, the transactional database 222 may send the quote identifier to the API gateway 214.

The API gateway 214 sends 510 the quote data to a user device 105b. For example, the API gateway 214 may send the property data and fee data to the user device 105b. The user devices 105a and 105b may be associated with different parties. The API gateway 214 may also send the quote data to the user device 105a. The quote data may be displayed by the user devices 105a or 105b for presentation to a user.

In some embodiments, the API gate 214 is connected to the other components, including user devices 105a and 105b, transactional database 222, property data source 234, and fee estimation source 232 using TLS encryption. The transactional database 222 may use Encryption at Rest to secure the quote data.

Figure 6:
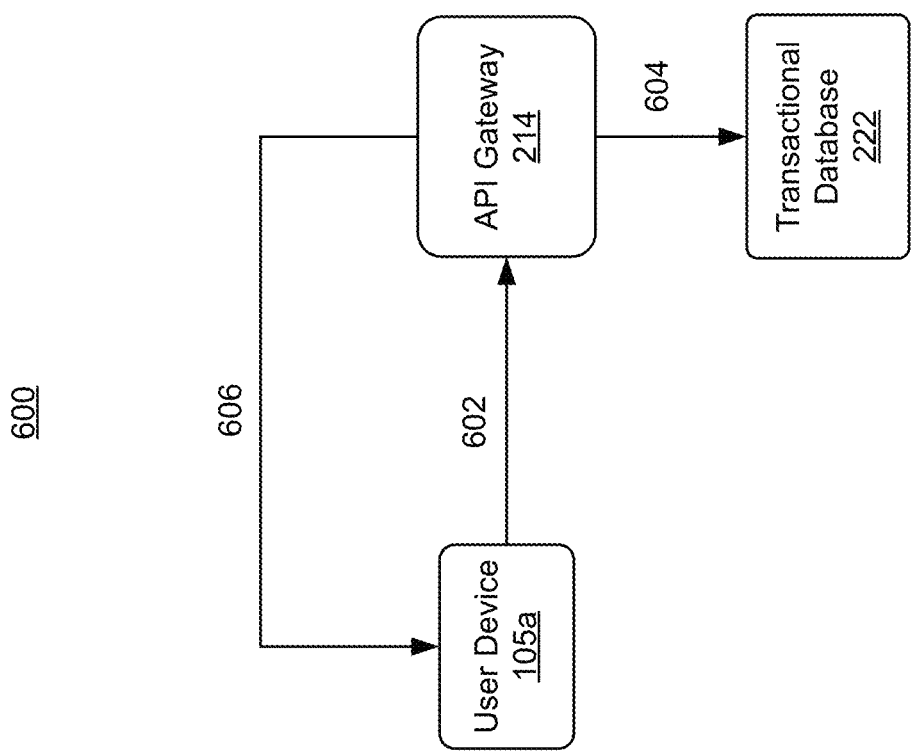
FIG. 6 is a diagram of a process for saving a mortgage quote, in accordance with one or more embodiments.

FIG. 6 is a diagram of a process 600 for saving a mortgage quote, in accordance with one or more embodiments. The process 600 may include fewer or additional steps, and steps may be performed in different orders than those described.

The user device 105a sends 602 a communication including a mortgage quote to the API gateway 214. The communication may be an email or some other type of communication. The communication may include the quote identifier of the mortgage quote. The communication may include quote data, such as property data, loan amount, purchase price, and fee data.

The API gateway 214 stores 604 the communication in the transactional database 222. The communication may include quote data that is different from existing quote data for the mortgage quote stored in the transactional database 222. In this case, the quote data in the transactional database 222 may be updated using the quote data in the communication. If the communication is an email, the email may be stored in the transactional database 222.

The API gateway 214 sends 606 a quote retrieval link for the quote data to the user device 105a. For example, the API gateway 214 may generate the quote retrieval link. The quote retrieval link may provide a reference to a webpage that presents that quote data. The quote retrieval link may be provided to the user device 105a by email, such as via an email notification API.

In some embodiments, the API gate 214 is connected to the other components, including the user device 105a, transactional database 222, and email notification API using TLS encryption. The transactional database 222 may use Encryption at Rest to secure the quote data.

Figure 7:
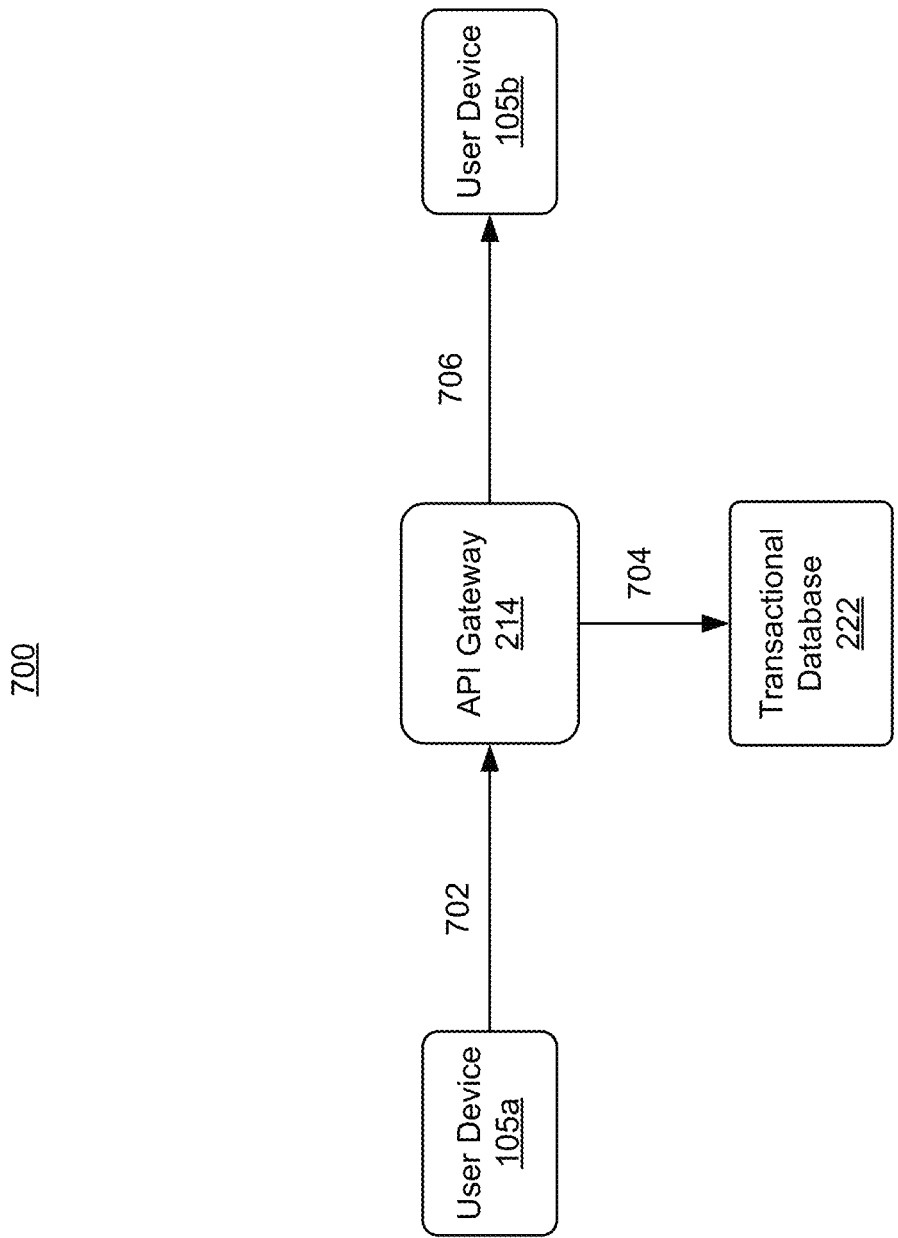
FIG. 7 is a diagram of a process for sharing a mortgage quote, in accordance with one or more embodiments.

FIG. 7 is a diagram of a process 700 for sharing a mortgage quote, in accordance with one or more embodiments. The process 700 may include fewer or additional steps, and steps may be performed in different orders than those described.

The user device 105a sends 702 a request to share a mortgage quote to the API gateway 214. The request may include a quote identifier, a recipient email of a user to receive the mortgage quote, a sender email of the user that is sharing the mortgage quote, and a message to the recipient user. The communication may be provided via email form the user device 105a.

The API gateway 214 stores 704 the communication in the transactional database 222. The communication may be stored in association with the quote identifier of the mortgage quote. If the communication is an email, the email may be stored in the transactional database 222.

The API gateway 214 sends 706 a quote retrieval link for the quote data to the user device 105b. For example, the API gateway 214 may generate the quote retrieval link. The quote retrieval link may provide a reference to a webpage that presents that quote data. The quote retrieval link may be provided to the user device 105b by email using the recipient email address, such as via an email notification API.

In some embodiments, the API gate 214 is connected to the other components, including the user device 105a and 105b, transactional database 222, and email notification API using TLS encryption. The transactional database 222 may use Encryption at Rest to secure the quote data.

Figure 8:
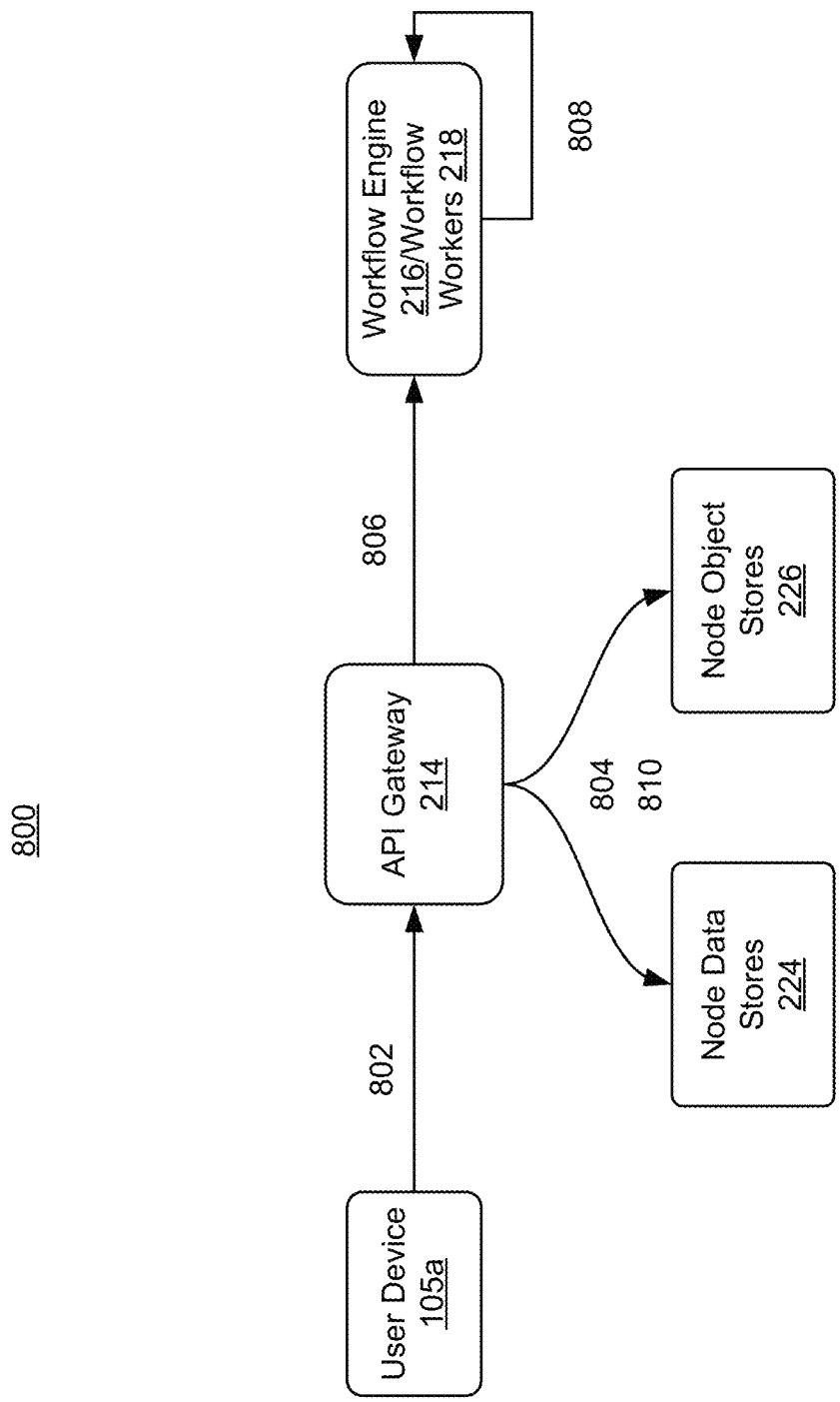
FIG. 8 is a diagram of a process for performing a transaction workflow, in accordance with one or more embodiments.

FIG. 8 is a diagram of a process 800 for performing a transaction workflow, in accordance with one or more embodiments. The process 800 may include fewer or additional steps, and steps may be performed in different orders than those described.

A user device 105a sends 802 a request for a transaction to the API gateway 214. The request may include order data and one or more documents. In one example, the transaction includes a post mortgage application process. The order data may include property data (e.g., address, county, municipality, state, etc.), a loan amount, a purchase price, quote data, contact information, and personal information for the borrower and co-borrower. The contact information may include contact information of various parties including the borrower, co-borrower (if applicable), buyer's agent, seller's agent, and lender. For each party, the contact information may include a first name, middle name, last name, company name, phone number, email address, and mailing address. The personal information for the borrower and co-borrower may include date of birth and social security number (e.g., last 4 digits). The one or more documents may include a sales contract.

The API gateway 214 may facilitate storing 804 of the order data in a block in the node data stores 224 of the blockchain nodes 220 associated with the parties. The API gateway 214 may also facilitate storing 804 the one or more documents in the node object store 226 of the blockchain nodes 220. The storing of the order data in the node data stores 224 may be based on successful verification and validation of the order data by each of the blockchain nodes 220, discussed in connection with the process 400 shown in FIG. 4. The API gateway 214 may also generate an order identifier for the post mortgage application process. In some embodiments, the order data and documents are verified, validated, and stored in the blockchain system 300, as discussed in connection with the process 400 shown in FIG. 4. After verification by each blockchain node 220 involved in the transaction and validation by the notary node 304, the order data is provided to the workflow engine 216 and workflow workers 218 for defining tasks that are executed by the workflow worker 218.

The API gateway 214 sends 806 the order data and documents to workflow engine 216 for creating a workflow including tasks and for execution of the tasks by workflow workers 218. For example, the workflow engine 216 generates process definition for the tasks based on the order data and documents. To execute the tasks, the workflow worker 218 may work with the LOB applications 236 and electronic signature applications 238. Completion of these tasks may result in creation of additional data and documents.

The workflow workers 218 execute 808 tasks to generate transaction data and documents. In one example of a task, a workflow worker 218 may submit an order for title and escrow production to an LOB application 236. The order may include the order data of the transaction. The workflow worker 218 may also send the order identifier to the LOB application 236.

In some embodiments, the LOB application 236 sends a file identifier for the order to the API gateway 214, which the API gateway may send 812 to the user device 105*a*. The file identifier allows the user device 105*a* to access the order in the LOD application 236 and facilitate execution of the order, such as by providing needed information or documents. In another example of a task, a workflow worker 218 provides a document for signature to an electronic signature application 238.

Transaction data generated by the workflow worker 218 may be stored 810 as blocks in the node data store 224 of the blockchain nodes 220. The documents generated by the workflow worker 218 (e.g., via interactions with the LOB application 236 or electronic signature application 238) may be stored 810 in the node object store 226 of the blockchain nodes 220. The transaction data and documents generated via task execution may be verified by each blockchain node 220 involved in the transaction and validated by the notary node 304.

Figure 9:
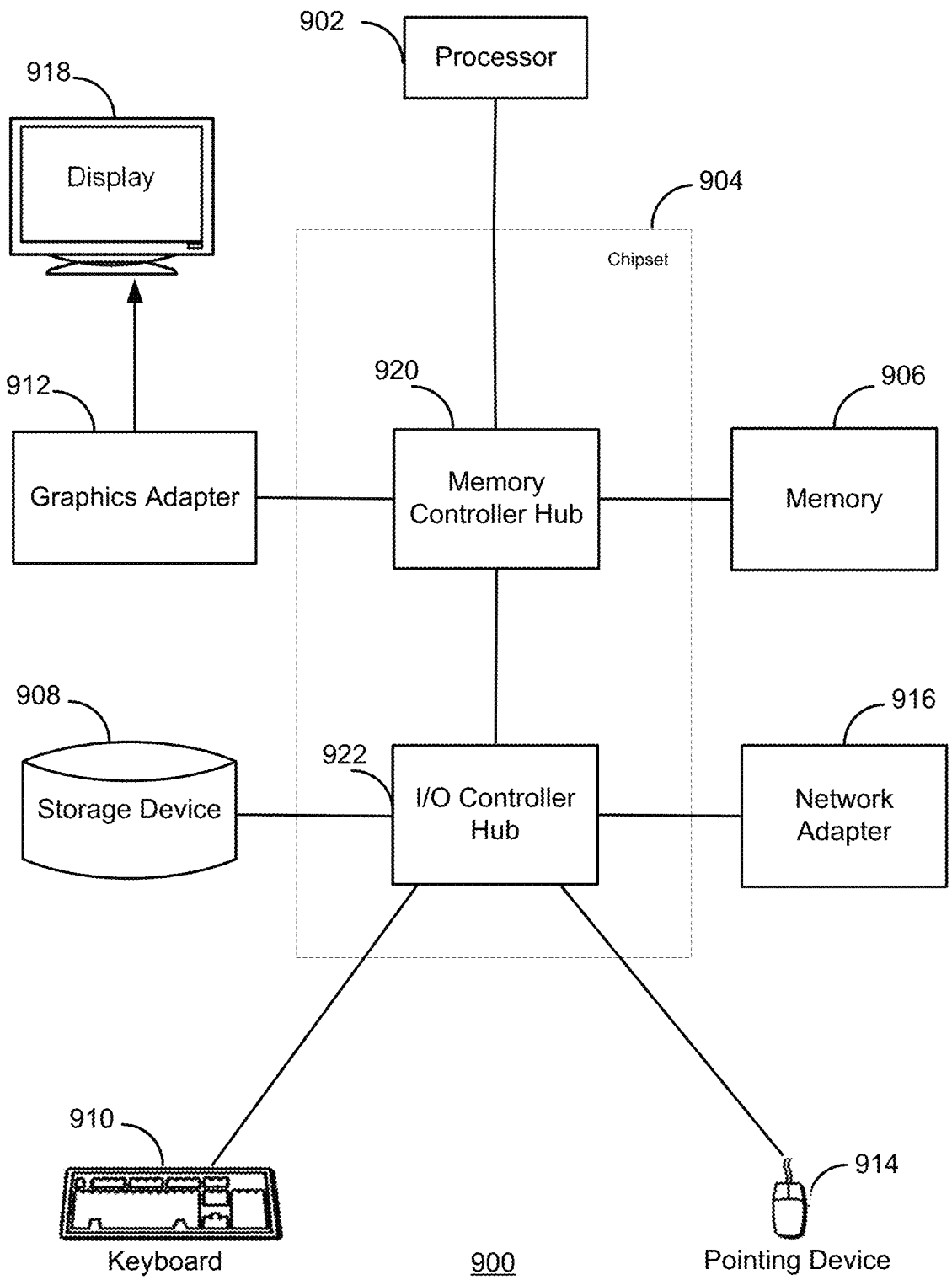
FIG. 9 is a block diagram illustrating an example of a computer, in accordance with some embodiments.

FIG. 9 is a high-level block diagram illustrating an example of a computer 900, according to one embodiment. The computer 900 is an example of circuitry that implements components of the servers 140 and databases 145 of the transaction workflow system 125, user devices 105, or third party systems 150. Illustrated are at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display device 918 is coupled to the graphics adapter 912. A storage device 908, keyboard 910, pointing device 914, and network adapter 916 are coupled to the I/O controller hub 922. Other embodiments of the computer 900 have different architectures. For example, the memory 906 is directly coupled to the processor 902 in some embodiments.

The storage device 908 includes one or more non-transitory computer-readable storage media such as a hard drive, compact disk read-only memory (CD-ROM), DVD, or a solid-state memory device. The memory 906 holds instructions and data used by the processor 902. The pointing device 914 is used in combination with the keyboard 910 to input data into the computer system 900. The graphics adapter 912 displays images and other information on the display device 918. In some embodiments, the display device 918 includes a touch screen capability for receiving user input and selections. The network adapter 916 couples the computer system 900 to the network 130. Some embodiments of the computer 900 have different and/or other components than those shown in FIG. 9.

The computer 900 is adapted to execute computer program modules for providing functionality described herein. For example, some embodiments may include a computing device including one or more modules configured to perform the process 400, 500, 600, 700, or 800 shown in FIGS. 4, 5, 6, 7, and 8. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 908, loaded into the memory 906, and executed by the processor 902.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
    receiving, by a first node of a first party to a transaction, transaction data for the transaction, the first node having a first node data store and a first node object store, wherein the first node data store includes a first blockchain storing information about transactions in which the first party was a participant;
    receiving a document for the transaction;
    determining a second party to the transaction based on the transaction data;
    validating, by the first node, the transaction data;
    in response to validating the transaction data, storing the document in the first node object store;
    generating a block for the transaction, the block including the transaction data, a hash generated using the transaction data, document metadata comprising a hash of content of the document, and a hash of a previous block in the first blockchain of the first node data store of the first node;
    sending the block and the document to a second node of the second party to the transaction, the second node having a second node data store and a second node object store, the second node data store including a second blockchain storing information about transactions in which the second party was a participant, wherein content of the second blockchain of the second node data store differs from content of the first blockchain of the first node data store;
    verifying the block by the second node;
    storing, by the second node, the verified block on the second blockchain in the second node data store of the second node;
    storing, by the second node, the document in the second node object store of the second node;
    receiving, by the first node, an indication that the second node has verified the block; and
    storing the verified block on the first blockchain in the first node data store.

2. The computer-implemented method of claim 1, further comprising enabling, by the first node and after receiving the indication that the second node has verified the block, execution of the transaction by one or more servers.

3. The computer-implemented method of claim 2, wherein:
    enabling execution of the transaction by the one or more servers comprises providing the transaction data to a workflow engine that executes on the one or more servers; and
    the method further comprises:
        generating, by the workflow engine, tasks of the transaction that are executable by a plurality of workflow workers that execute on the one or more servers; and
        executing, by the plurality of workflow workers, the tasks.

4. The computer-implemented method of claim 3, wherein executing the tasks includes generating second transaction data and the method further comprises:
    generating a second block including the second transaction data and a second hash generated using the second transaction data;
    sending the second block to the second node;
    receiving a second indication that the second node has verified the second block; and
    storing the verified second block in the node data store of the first node.

5. The computer-implemented method of claim 3, wherein executing the tasks includes obtaining an electronic signature for a document associated with the transaction.

6. The computer-implemented method of claim 1, wherein the document metadata includes one or more of:
    a document name;
    a document type;
    a document version; or
    document audit history.

7. The computer-implemented method of claim 1, wherein the transaction data includes property data for a real estate property, a loan amount, a purchase price for the property, and fee data.

8. The computer-implemented method of claim 1, wherein receiving the transaction data includes:
    receiving property data from a property data source; and
    receiving fee data from a fee estimation source.

9. The computer-implemented method of claim 1, further comprising, the first node in response to receiving the indication that the second node has verified the block:
    providing the block to a notary node for notary verification; and
    receiving an indication that the notary node has verified the block, wherein the block is stored in the first node data store of the first node in response to the block being verified by the notary node.

10. A system, comprising:
    a blockchain system including a plurality of nodes, the plurality of nodes including a first node of a first party to a transaction, the first node comprising one or more processors, a first node data store on one or more non-transitory computer-readable media, a first node object store on the one or more non-transitory computer-readable media, wherein the first node data store includes a first blockchain storing information about transactions in which the first party was a participant, the first node configured to:
        receive transaction data for the transaction;

receive a document for the transaction;
determine a second party to the transaction based on the transaction data;
validate the transaction data;
in response to validating the transaction data, store the document in the first node object store;
generate a block for the transaction, the block including the transaction data, a hash generated using the transaction data, document metadata comprising a hash of content of the document, and a hash of a prior block in the first blockchain;
send the block and the document to a second node of the plurality of nodes, the second node being of the second party, the second node comprising one or more processors, a second node data store on one or more non-transitory computer-readable media, and a second node object store on the one or more non-transitory computer-readable media, the second node data store including a second blockchain storing information about transactions in which the second party was a participant, wherein content of the second blockchain differs from content of the first blockchain;
receive an indication that the second node has verified the block; and
store the verified block on the first blockchain in the node data store,
wherein the second node is configured to:
verify the block;
store the verified block on the second blockchain in the second node data store; and
store the document the a second node object store.

11. The system of claim 10, further comprising one or more servers, and wherein the first node is further configured to, after receiving the indication that the second node has verified the block, enable execution of the transaction by the one or more servers.

12. The system of claim 11, wherein:
the first node configured to enable execution of the transaction by the one or more servers comprises providing the transaction data to a workflow engine that executes on the one or more servers;
the workflow engine is configured to generate tasks of the transaction that are executable by a plurality of workflow workers that execute on the one or more servers; and
the plurality of workflow workers is configured to execute the tasks to generate a document and second transaction data for the transaction.

13. The system of claim 12, wherein the plurality of workflow workers configured to generate the document includes the plurality of workflow workers being configured to obtain an electronic signature for the document.

14. The system of claim 12, wherein the plurality of workflow workers being configured to execute the tasks includes the plurality of workflow workers being configured to generate second transaction data and the first node is further configured to:
generate a second block including the second transaction data and a second hash generated using the second transaction data;
send the second block to the second node;
receive a second indication that the second node has verified the second block; and
store the verified second block in the node data store of the first node.

15. The system of claim 12, wherein the plurality of workflow workers being configured to execute the tasks comprises the plurality of workflow workers being configured to obtain an electronic signature for a document associated with the transaction.

16. The system of claim 10, wherein the document metadata includes one or more of:
a document name;
a document type;
a document version; or
document audit history.

17. The system of claim 10, wherein the first node is further configured to, in response to receiving the indication that the second node has verified the block:
provide the block to a notary node for notary verification; and
receive an indication that the notary node has verified the block, wherein the block is stored in the first node data store of the first node in response to the block being verified by the notary node.

18. A non-transitory computer readable medium comprising stored program code, the program code when executed by one or more processors of a first node configures the first node to:
receive transaction data for a transaction, the first node being of a first party to the transaction and having a first node data store and a first node object store, wherein the first node data store includes a first blockchain storing information about transactions in which the first party was a participant;
receive a document for the transaction;
determine a second party to the transaction based on the transaction data;
validate the transaction data;
in response to validating the transaction data, store the document in the first node object store;
generate a block for the transaction, the block including the transaction data, a hash generated using the transaction data, document metadata comprising a hash of content of the document, and a hash of a prior block in the first blockchain;
send the block and the document to a second node of the second party to the transaction, the second node having a second node data store and a second node object store, the second node data store including a second blockchain storing information about transactions in which the second party was a participant, the content of the second differing from content of the first blockchain, wherein the second node is configured to:
verify the block;
store the verified block on the second blockchain in the second node data store of the second node; and
store the document in the second node object store of the second node;
receive an indication that the second node has verified the block; and
store the verified block on the first blockchain in the first node data store.

19. The non-transitory computer readable medium of claim 18, wherein the program code further configures the one or more processors to, after receiving the indication that the second node has verified the block, enable execution of the transaction.

20. The non-transitory computer readable medium of claim 18, wherein the computer program code further configures the first node to, in response to receiving the indication that the second node has verified the block:

provide the block to a notary node for notary verification; and receive an indication that the notary node has verified the block, wherein the block is stored in the first node data store of the first node in response to the block being verified by the notary node.

\* \* \* \* \*

UNITED STATES PATENT AND TRADEMARK OFFICE
CERTIFICATE OF CORRECTION

| | | |
|---|---|---|
| PATENT NO. | : 12,051,062 B2 | |
| APPLICATION NO. | : 17/503569 | |
| DATED | : July 30, 2024 | |
| INVENTOR(S) | : Wai et al. | |

It is certified that error appears in the above-identified patent and that said Letters Patent is hereby corrected as shown below:

In the Claims

In Column 20, in Claim 10, Line 61, after "media," insert -- and --.

In Column 21, in Claim 10, Line 33, delete "the a" and insert -- in the --, therefor.

Signed and Sealed this
Fifth Day of November, 2024

Katherine Kelly Vidal
*Director of the United States Patent and Trademark Office*